United States Patent
Peng

(10) Patent No.: US 10,635,511 B2
(45) Date of Patent: Apr. 28, 2020

(54) KERNEL UPDATE METHOD AND APPARATUS, AND COMPUTER DEVICE

(71) Applicant: Huawei Technologies Co., Ltd., Shenzhen (CN)

(72) Inventor: Ruilin Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/004,044

(22) Filed: Jun. 8, 2018

(65) Prior Publication Data

US 2018/0293117 A1  Oct. 11, 2018

Related U.S. Application Data

(63) Continuation of application No. PCT/CN2016/112370, filed on Dec. 27, 2016.

(51) Int. Cl.
*G06F 9/54* (2006.01)
*G06F 9/4401* (2018.01)
*G06F 8/656* (2018.01)

(52) U.S. Cl.
CPC .............. *G06F 9/545* (2013.01); *G06F 8/656* (2018.02); *G06F 9/4406* (2013.01)

(58) Field of Classification Search
None
See application file for complete search history.

(56) References Cited

U.S. PATENT DOCUMENTS

| 7,890,664 B1* | 2/2011 | Tao ..................... G06F 9/44505 710/15 |
| 2005/0071856 A1* | 3/2005 | Kumar ................ G06F 9/44521 719/330 |
| 2007/0061372 A1* | 3/2007 | Appavoo ................ G06F 8/656 |

(Continued)

FOREIGN PATENT DOCUMENTS

| CN | 101000592 A | 7/2007 |
| CN | 101655801 A | 2/2010 |

(Continued)

OTHER PUBLICATIONS

Foreign Communication From a Counterpart Application, European Application No. 16923129.7, Extended European Search Report dated Jan. 23, 2019, 8 pages.

(Continued)

*Primary Examiner* — Shih-Wei Kraft
(74) *Attorney, Agent, or Firm* — Conley Rose, P.C.

(57) ABSTRACT

A kernel update method, a computer program product and a computer device, where the computer device sets a first interface mapping table to be invalid such that an interface block stops sending a service request of a service application to a driver logic of a first driver logic block such that the first driver logic block temporarily stops providing a driver service for the service application, replaces the first driver logic block in the loadable kernel with a second driver logic block, and records, in a second interface mapping table, a correspondence of each interface in the interface block to a driver logic in the second driver logic block. Therefore, the second driver logic block executes a driver logic on a new service request from the interface block according to the second interface mapping table.

15 Claims, 5 Drawing Sheets

(56) References Cited

U.S. PATENT DOCUMENTS

| | | |
|---|---|---|
| 2007/0174849 A1 | 7/2007 | Cheung et al. |
| 2012/0265866 A1* | 10/2012 | Stanciu .............. G06F 11/3003 709/223 |
| 2014/0359593 A1 | 12/2014 | Cohen et al. |

FOREIGN PATENT DOCUMENTS

| | | |
|---|---|---|
| CN | 102830983 A | 12/2012 |
| CN | 104679532 A | 6/2015 |
| CN | 105335195 A | 2/2016 |
| WO | 2015078294 A1 | 6/2015 |

OTHER PUBLICATIONS

Machine Translation and Abstract of Chinese Publication No. CN101000592, Jul. 18, 2007, 15 pages.

Machine Translation and Abstract of Chinese Publication No. CN101655801, Feb. 24, 2010, 10 pages.

Machine Translation and Abstract of Chinese Publication No. CN102830983, Dec. 19, 2012, 6 pages.

Machine Translation and Abstract of Chinese Publication No. CN105335195, Feb. 17, 2016, 18 pages.

\* cited by examiner

KERNEL UPDATE METHOD AND APPARATUS, AND COMPUTER DEVICE

CROSS-REFERENCE TO RELATED APPLICATION

This application is a continuation of International Patent Application No. PCT/CN2016/112370 filed on Dec. 27, 2016, which is hereby incorporated by reference in its entirety.

TECHNICAL FIELD

This application relates to the computer field, and in particular, to a kernel update method and apparatus, and a computer device.

BACKGROUND

A kernel of an operating system (OS) is classified into a base kernel and a loadable kernel module (LKM).

The loadable kernel module provides at least one driver. When a driver in the loadable kernel module needs to be used, a file for implementing the loadable kernel module is temporarily loaded into a memory, and the file is run to implement the driver. When the file is run, another driver included in the loadable kernel module is also implemented.

Computer instructions and data for implementing all drivers in the loadable kernel module are stored in a same file. Therefore, in other approaches, an implementation of updating the loadable kernel module includes unloading an entire original loadable kernel module, and then loading a file for a new loadable kernel module into the memory. When a loadable kernel module is updated, a communications connection between the loadable kernel module and a service application is still disconnected even if a driver in the loadable kernel module is providing a driver service for the service application. Therefore, the service application cannot continue to send a service request for the driver service to the loadable kernel module, and consequently the driver service is terminated.

SUMMARY

In view of this, this application provides a kernel update method and apparatus, and a computer device in order to avoid terminating a driver service provided for a service application during update of a loadable kernel module.

According to a first aspect, this application provides a kernel update method, and the kernel update method is used to update a loadable kernel module of a kernel. The loadable kernel module includes an interface module and a first driver logic module, the interface module includes at least one interface of each of at least one driver, and the first driver logic module includes at least one driver logic of each of the at least one driver.

According to this application, a first interface mapping table records each interface in the interface module and a driver logic corresponding to the interface. In this way, the interface module may forward, according to the first interface mapping table, a received service request of a service application to a first driver logic corresponding to an interface that receives the service request, and the first driver logic module executes the first driver logic on the service request. The first driver logic is a driver logic that provides a driver service for the service application and that is in the first driver logic module.

When the loadable kernel module is updated, a computer device executes the following steps of the kernel update method first, the computer device sets the first interface mapping table to be invalid, where the invalid first interface mapping table makes the interface module stop sending a new service request to the first driver logic according to the first interface mapping table, and the new service request is a service request that is of the service application and that is received after the first interface mapping table is set to be invalid. Then, the computer device replaces the first driver logic module in the loadable kernel module with a second driver logic module, where the second driver logic module is an updated driver logic module, and the second driver logic module includes a second driver logic capable of providing a driver service for the service application. Finally, the computer device records, in a second interface mapping table, each interface in the interface module and a driver logic that is corresponding to the interface and that is in the second driver logic module. After the loadable kernel module is updated, the interface module may send, according to the second interface mapping table, the new service request to the second driver logic in the second driver logic module.

In the kernel update method according to this embodiment of the present application, a communications connection between the service application and the interface module is not interrupted during replacement of a driver logic module. After replacement of the driver logic module is completed, the service application may continue to send a service request to the interface module based on the communications connection. The driver logic module responds to the service request in order to resume the driver service provided for the service application. It can be learned that compared with the other approaches in which a driver service provided for a service application needs to be terminated when a loadable kernel module is updated, in this embodiment of the present application, the driver service provided for the service application is only temporarily stopped when the loadable kernel module is updated. Because a short time is required for updating the loadable kernel module using the kernel update method, time costs for resuming the driver service are reduced, and efficiency of resuming the driver service is improved. To sum up, according to the kernel update method, the loadable kernel module can be updated without sensing by a user.

In a possible design, the loadable kernel module further includes a data module, where the data module records a state of providing a driver service for the service application by the first driver logic before the first driver logic is replaced with the second driver module. After the computer device replaces the first driver logic module in the loadable kernel module with the second driver logic module, the second driver logic module executes, based on the state recorded in the data module, the second driver logic on the new service request.

The second driver module executes, based on the state of the first driver module before the replacement, the second driver logic on the new service request to continue to provide the driver service for the service application. Therefore, continuity in providing the driver service is ensured, and the loadable kernel module is also updated without sensing by a user.

In a possible design, in the kernel update method, if the state recorded in the data module is data in a first version, the computer device updates the data in the first version in the data module to data in a second version supported by the second driver logic module. The first version and the second version may mean different formats, or may mean different arrangement manners of data arrangement.

A version of the state is updated such that the second driver logic module can identify the state recorded in the data module, and execute, based on the state, the second driver logic on the new service request.

In a possible design, in the kernel update method, if the state recorded in the data module is data in a first format, but the second driver logic module supports a second format, the computer device updates the data in the first format to data in the second format. In this case, the second driver logic module can identify the state recorded in the data module, and execute, based on the state, the second driver logic on the new service request.

In a possible design, in the kernel update method, the computer device receives a kernel update instruction for updating the loadable kernel module, and determines, before replacing the first driver logic module, whether the first driver logic module successfully executes an earlier service request. The earlier service request is any service request on which the first driver logic module executes the first driver logic when the kernel update instruction is received. After the first driver logic module successfully executes the earlier service request, the computer device sets the first interface mapping table to be invalid. In this way, continuity in providing the driver service for the service application can be ensured.

In a possible design, a specific implementation of setting, by the computer device, the first interface mapping table to be invalid is as follows. The computer device sets an invalidity identifier for the first interface mapping table, and the invalidity identifier indicates to the interface module that the first interface mapping table is invalid. The interface module does not use the invalid first interface mapping table to forward a service request. Because time costs and resource loss costs for setting an invalidity identifier are relatively low, it is efficient to set the first interface mapping table to be invalid by setting the invalidity identifier.

In a possible design, a specific implementation of setting, by the computer device, the first interface mapping table to be invalid includes deleting all driver logics included in the first driver logic module that are recorded in the first interface mapping table. In this way, the computer device can use, as the second interface mapping table, the first interface mapping table from which all the driver logics included in the first driver logic module are deleted, and record, in the second interface mapping table, a driver logic that is corresponding to an interface in the interface module and that is in the second driver logic module. Compared with generation of the second interface mapping table using a new table, in this implementation, data that need to be recorded during generation of the second interface mapping table is reduced, and recording efficiency is improved.

In a possible design, a specific implementation of replacing, by the computer device, the first driver logic module with the second driver logic module includes unloading the first driver logic module from the loadable kernel module, and loading the second driver logic module into the loadable kernel module. When the first driver logic module is unloaded, a resource (for example, a memory resource) occupied by the first driver logic module can be completely released, and then an appropriate resource is allocated for loading the second driver logic module. In this way, a resource can be effectively used.

According to a second aspect, this application provides a kernel update apparatus, including function modules configured to execute the kernel update method provided in the first aspect or any possible design of the first aspect. Division of the function modules is not limited in the second aspect. The function modules may be divided according to procedure steps of the kernel update method, or may be divided according to a specific implementation requirement.

According to a third aspect, this application provides a computer device, where the computer device includes a processor and a storage. The storage stores computer instructions, and the processor executes the computer instructions stored in the storage such that the computer device performs the kernel update method provided in the first aspect or the possible designs of the first aspect, or the computer device implements the kernel update apparatus provided in the second aspect.

According to a fourth aspect, a computer-readable storage medium is provided, where the computer-readable storage medium stores computer instructions, and when a processor of a computer device executes the computer instructions, the computer device performs the kernel update method provided in the first aspect or the possible designs of the first aspect, or the computer device is deployed with the kernel update apparatus provided in the second aspect.

According to a fifth aspect, a computer program product is provided, where the computer program product includes computer instructions, and the computer instructions is stored in a computer-readable storage medium. A processor of a computer device can read the computer instructions from the computer-readable storage medium, and the processor executes the computer instructions such that the computer device implements the kernel update method provided in the first aspect or the possible designs of the first aspect, or the computer device is deployed with the kernel update apparatus provided in the second aspect.

DESCRIPTION OF EMBODIMENTS

The following describes the technical solutions in the embodiments of the present application with reference to the accompanying drawings in the embodiments of the present application.

Computer Device Embodiment

Figure 1:
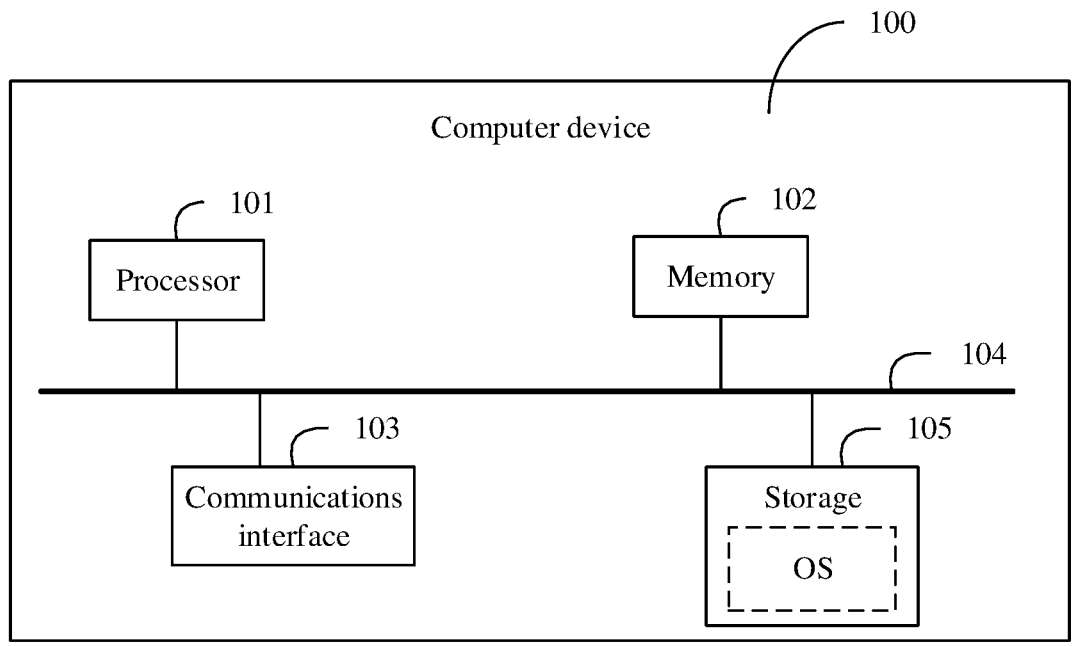
FIG. 1 is a schematic diagram of a hardware structure of a computer device according to an embodiment of the present application.

Referring to FIG. 1, a computer device 100 includes a processor 101, a memory 102, a communications interface 103, a bus 104, and a storage 105.

The storage 105 stores computer instructions and data, for example, the storage 105 stores computer instructions and data that are related to an OS. The storage 105 may be any one or a combination of the following storage media, a read-only memory (ROM), a non-volatile memory (NVM), a solid-state drive (SSD), a hard disk drive (HDD), a magnetic disk, a disk array, and the like.

The processor 101 may be any one of the following components with a computation processing capability, a central processing unit (CPU), an Advanced reduced instruction set computing (RISC) Machine (ARM) processor, a field-programmable gate array (FPGA), an application-specific processor, and the like.

The memory 102 is configured to cache computer instructions run by the processor 101 and data processed by the processor 101. For example, the memory 102 is configured to cache computer instructions and data that are loaded from the storage 105 by the processor 101. For another example, the memory 102 is configured to cache a temporary processing result (which belongs to either computer instructions or data) of the processor 101.

The memory 102 may include a volatile memory and/or an NVM. For example, the memory 102 may be any one or a combination of the following storages, a random access memory (RAM), a synchronous dynamic RAM (SDRAM), a double data rate (DDR) SDRAM, and an NVM.

The communications interface 103 is configured to exchange data with another device (for example, another computer device or a mobile terminal) by the computer device 100. The communications interface 103 may be any one or a combination of the following components with a network access function, a network interface (for example, an Ethernet interface), a wireless network interface card, and the like.

The bus 104 includes a memory bus, and may further include any one or a combination of the following components for data transmission, an industry standard architecture (ISA) bus, a peripheral component interconnect (PCI) bus, an extended ISA (EISA) bus, and the like. In FIG. 1, the bus 104 is represented by a bold line.

The processor 101, the memory 102, the communications interface 103, and the storage 105 are connected using the bus 104. In this way, the processor 101 can access the memory 102 and the storage 105 using the bus 104, and use the bus 104 to exchange data with another device (for example, another computer device or a mobile terminal) using the communications interface 103.

In this embodiment of the present application, the processor 101 executes computer instructions stored in the storage 105 such that the computer device 100 performs methods (for example, a kernel update method) provided in the following method embodiments, or the computer device 100 implements an apparatus (for example, a kernel update apparatus) provided in an apparatus embodiment.

The following describes a kernel of an OS.

Figure 2:
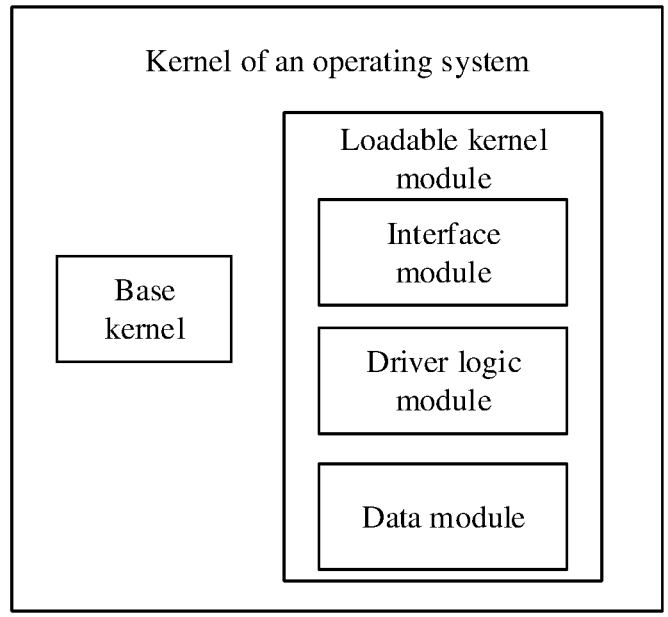
FIG. 2 is a schematic diagram of function division of a kernel according to an embodiment of the present application.

Referring to FIG. 2, kernels of an OS are classified into a base kernel and a loadable kernel module.

The base kernel is a core part of the kernel. Therefore, a file for the base kernel is a part necessary to be loaded. Further, the file for the base kernel is loaded into a memory each time the OS is started, and a function of the base kernel is implemented by running the file for the base kernel.

The loadable kernel module is an optional part of the kernel and provides at least one driver. It should be learned that all drivers in the loadable kernel module are loaded or unloaded simultaneously. In the other approaches, when a driver in the loadable kernel module needs to be used, a file for implementing the loadable kernel module is temporarily loaded into the memory, and the file is run to implement the driver. Subsequently, when the driver does not need to be used, the entire loadable kernel module may be unloaded, and this includes releasing a resource occupied to implement the loadable kernel module. For example, the file is deleted from the memory to release a memory resource. Therefore, the loadable kernel module is configured to provide more drivers on a basis of the base kernel in order to implement function expansion, and/or the loadable kernel module is configured to upgrade a driver in the base kernel.

The loadable kernel module has different names in different OSs. For example, in a UNIX system (UNIX-like systems, for example UN*X or *nix) or MICROSOFT WINDOWS, the loadable kernel module may be differently named for OSs of different versions. For example, in a LINUX OS, the loadable kernel module is still referred to as a loadable kernel module (LKM). For example, in a FREEBSD, the loadable kernel module is referred to as a kernel loadable module. For example, in a MACOS, the loadable kernel module is referred to as a kernel extension. For example, in an AIX OS, the loadable kernel module is referred to as a kernel extension module. For example, in a WINDOWS NT, the loadable kernel module is referred to as a kernel-mode driver. For example, in a VXWORKS OS, the loadable kernel module is referred to as a downloadable kernel module (DKM). In addition, in some other OSs, the loadable kernel module may be referred to as a kernel loadable module (KLM), or may be directly referred to as a kernel module (KMOD) for short. It should be learned that the KMOD herein does not include the base kernel of the kernel.

Division of a Loadable Kernel Module

Referring to FIG. 2, a loadable kernel module according to this embodiment of the present application includes an interface module and a driver logic module. Therefore, when the loadable kernel module is deployed, a file used to implement the interface module and a file used to implement the driver logic module need to be separately loaded into an OS.

In this embodiment of the present application, a driver provided by the loadable kernel module is implemented using the interface module and the driver logic module. Further, the driver provided by the loadable kernel module is divided into an interface of the driver and a driver logic of the driver. The interface of the driver is deployed in the interface module, and the driver logic of the driver is deployed in the driver logic module. The driver logic is a module that provides a driver service for a service application.

Further, the loadable kernel module provides at least one driver. Each driver has at least one interface and at least one driver logic. The interface of the driver is in a one-to-one correspondence with the driver logic of the driver. An interface of each driver provided by the loadable kernel module is deployed in the interface module, and a driver logic of each driver provided by the loadable kernel module is deployed in the driver logic module.

The interface module receives a service request of a service application using the interface, and forwards the service request to a corresponding driver logic in the driver logic module according to an interface mapping table.

In this embodiment of the present application, according to a correspondence between an interface of a driver and a driver logic of the driver, each interface in the interface module and a driver logic corresponding to each interface in the interface module are recorded in the interface mapping table. That is, correspondences between all interfaces in the interface module and all driver logics in the driver logic module are recorded in the interface mapping table. In this way, the interface module can find, in the interface mapping table according to an interface that receives a service request, a driver logic corresponding to the interface, and forwards the service request to the driver logic.

It should be learned that the interface mapping table in this embodiment of the present application is newly added in comparison with the other approaches. Addition of the interface mapping table is intended to enable the interface module to correctly forward a received service request to a driver logic. In addition, in this embodiment of the present application, the interface mapping table may be used to control whether to forward a service request received by the interface module to a driver logic in order to control whether to temporarily stop providing a driver service for a service application.

In this embodiment of the present application, the interface mapping table records each interface in the interface module and a driver logic corresponding to each interface in the interface module, including recording a correspondence between an identifier of a driver logic in the driver logic module and an interface in the interface module. The identifier of the driver logic is used to uniquely determine a driver logic included in the driver logic module. For example, the identifier of the driver logic may be an interface of the driver logic. In this way, after the interface of the driver logic is determined according to the interface mapping table, a service request may be forwarded to the interface of the driver logic such that the service request is forwarded to the driver logic.

Optionally, a mapping relationship that is between an interface in the interface module and an interface of a driver logic in the driver logic module and that is recorded in the interface mapping table is a one-to-one mapping relationship.

For example, in an interface mapping table in Table 1, interfaces of four driver logics respectively mapped to four interfaces ("socket", "send", "recv", and "close") in the interface module are sequentially "main_socket", "main_send", "main_recv", and "main_close". The four driver logics sequentially have functions of "establishing a communications connection between a service application and a driver using a socket", "driving sending data to a service application based on the communications connection", "driving receiving data from a service application based on the communications connection", and "closing the communications connection established using the socket".

TABLE 1

| Interface in an interface module | Interface of a driver logic |
|---|---|
| socket | main_socket |
| send | main_send |
| recv | main_recv |
| close | main_close |

In this embodiment of the present application, the interface mapping table may be deployed in the interface module, or deployed independently, or deployed in another module. However, the interface module can access the interface mapping table in all the foregoing cases.

The driver logic module executes a driver logic to provide a driver service. Each driver has at least one driver logic. Different driver logics implement different functions, and therefore different driver logics provide different driver services.

The driver logic may be implemented using a program (which includes computer instructions and data). The program is recorded in a file (a file used for implementing the driver logic module). The driver logic module executes the driver logic, including loading the file into the memory, and executing the program in the file to implement a function corresponding to the driver logic. It should be learned that if the file is already in the memory, the step of loading the file to the memory may be skipped during execution of the driver logic.

Each driver logic has an interface, and the interface of each driver logic has a corresponding interface in the interface module, as shown in Table 1. It should be learned that when a service application expects a driver logic to provide a driver service, the service application needs to send, to an interface (corresponding to an interface of the driver logic) in the interface module, a service request corresponding to the driver logic. In this way, the interface module can correctly forward, to the interface of the driver logic according to the interface mapping table, the service request received from the interface such that the driver logic module can receive the service request using the interface of the driver logic and execute the driver logic on the service request.

It should be learned that all drivers provided in the loadable kernel module are loaded or unloaded simultaneously. In this embodiment of the present application, when a driver in the loadable kernel module needs to be used, a file for implementing the interface module and a file for implementing the driver logic module are loaded to the memory. Subsequently, when all drivers in the driver logic module do not need to be used, the interface module and the driver logic module are unloaded, and this includes releasing resources separately occupied by the interface module and the driver logic module, for example, deleting, from the memory, the file for implementing the interface module and the file for implementing the driver logic module to release memory resources.

In this embodiment of the present application, a major task in updating the loadable kernel module is to update the driver logic module, for example, to unload an original driver logic module (may be referred to as a first driver logic module), including deleting, from the memory, a file for implementing the original driver logic module, and to load a file for a new driver logic module (may be referred to as a second driver logic module) into the memory in order to update the driver logic module. It can be learned that in this embodiment of the present application, the interface module may not need to be unloaded in a process of updating the driver logic module. This is different from the other approaches in which an entire loadable kernel module needs to be replaced.

Optionally, referring to FIG. 2, the loadable kernel module may further include a data module.

The data module is configured to store a state of providing a driver service for a service application by the first driver logic module before the first driver logic module is unloaded. In this way, after the second driver logic module is loaded, the second driver logic module can continue to provide the driver service for the service application according to the state.

Further, the service application continually sends a service request to the first driver logic module. After the first driver logic module executes a driver logic on a last one service request before the first driver logic module is unloaded, the data module stores a state of providing the driver service for the service application by the first driver logic module.

If driver logics of multiple drivers included in the first driver logic module separately provide a driver service for the service application, a state of providing a driver service for a service application by each of the driver logics of the multiple drivers needs to be stored in the data module.

Generally, states in providing a driver service for a service application by driver logics of different drivers are different. Table 2 is used as an example.

Referring to Table 2, a state of providing a driver service for a service application by a driver logic of a network driver includes a file handle (for example, a socket handle) used by the network driver, an Internet Protocol (IP) address of a communications peer (for example, a remote server) of the network driver, and a port number of the communications peer.

Referring to Table 2, a state of providing a driver service for a service application by a driver logic of a file system driver includes a mount point for mounting a file system by the file system driver.

Referring to Table 2, a state of providing a driver service for a service application by a driver logic of a hardware driver includes a configuration parameter of hardware driven by the hardware driver and a register status of the hardware driven by the hardware driver.

Referring to Table 2, a state of providing a driver service for a service application by a driver logic of a block storage driver includes a number of a virtual disk used by the block storage driver, and may further include a capacity size of a virtual block device driven by the block storage driver.

TABLE 2

| Driver logic | State |
| --- | --- |
| Driver logic of a network driver | File handle, and an IP and a port number of a communications peer |
| Driver logic of a file system driver | Mount point for mounting a file system |
| Driver logic of a hardware driver | Configuration parameter of hardware and a register status of hardware |
| Driver logic of a block storage driver | Capacity of a virtual block device and a number of a virtual disk |

Optionally, if there is no state of providing a driver service for a service application by the first driver logic module before the first driver logic module is unloaded, the data module does not need to store the state. Therefore, the loadable kernel module may not include the data module. In this way, a memory resource required by the data module can be saved.

Optionally, if the state of providing a driver service for a service application by the first driver logic module is not required for loading the second driver logic module, the data module does not need to store the state. Therefore, the loadable kernel module may not include the data module. In this way, a memory resource required by the data module can be saved.

Method Embodiment

Figure 3:
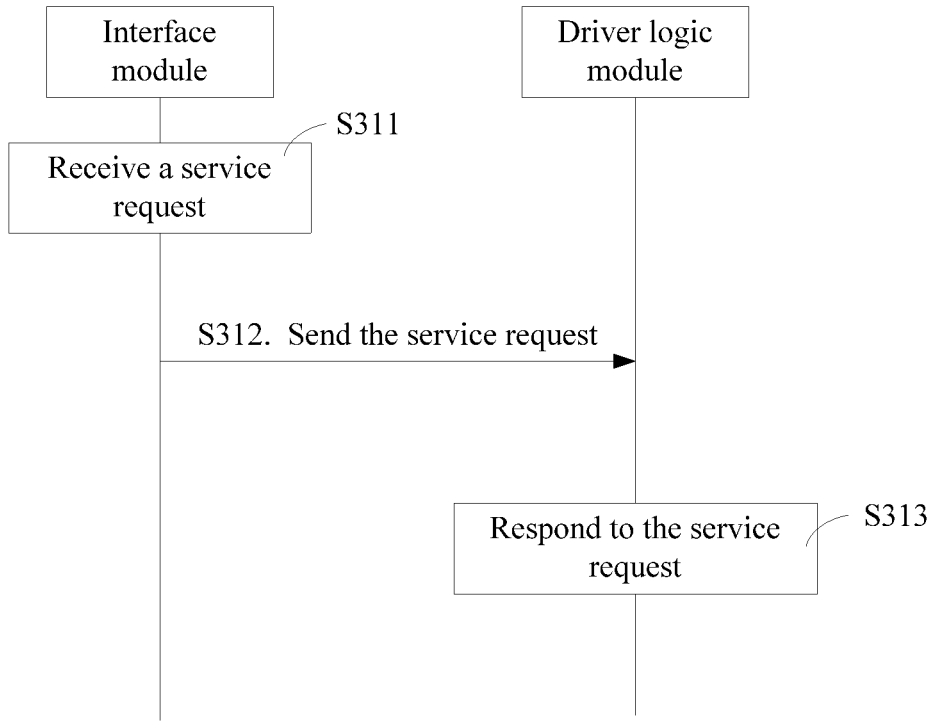
FIG. 3 is a schematic flowchart of providing a driver service in response to a service request according to an embodiment of the present application.

Method Flowchart of Providing a Driver Service in Response to a Service Request Normally Based on that a loadable kernel module includes an interface module and a driver logic module, a response flowchart of providing a driver service in response to a service request by the loadable kernel module is shown in FIG. 3.

Step S311: The interface module receives a service request sent by a service application.

Step S312: The interface module forwards the service request to the driver logic module.

In this embodiment of the present application, the service application sends the service request to a driver in the loadable kernel module, and sends the service request to an interface, in the interface module, of the driver.

It should be learned that each service application may use at least one driver. When the service application expects to use a driver, the service application sends a service request to an interface, in the interface module, of the driver.

For example, when the service application expects to use a network driver, the service application sends, to an interface that is of the network driver and is in the interface, a network input/output (I/O) request that carries to-be-transmitted data. The network I/O request is a type of service request. When the service application expects to write data into a file system, the service application sends, to an interface, in the interface module, of a file system driver, a write request that carries to-be-written data. The write request is a type of service request.

It should be learned that multiple service applications may use a same driver. Multiple service applications that expect to use a driver may all send at least one service request to the driver.

For example, when different service applications expect to transmit data using a network, the different service applications may separately send, to an interface that is of the network driver and is in the interface module, a network I/O request that carries to-be-transmitted data. Subsequently, the interface module sequentially forwards all the received network I/O requests to a driver logic, in the driver logic module, of the network driver. The driver logic module executes the driver logic once on all the network I/O requests in order to separately send data carried in all the network I/O requests to the network.

It should be learned that there may be one or more drivers, and the driver is merely used by only a single service application. When the service application expects to use the driver, the service application may send a service request to an interface, in the interface module, of the driver.

When receiving multiple service requests of a service application, the interface module may directly forward the multiple service requests to a driver logic, in the driver logic module, of the driver without buffering the multiple service requests, or may buffer the multiple service requests and then forward the buffered multiple service requests to the driver logic.

Optionally, when buffering multiple service requests for a driver, the interface module sorts the multiple service requests according to a time sequence for receiving each service request. Subsequently, the interface module sequentially forwards the sorted multiple service requests to a driver logic, in the driver logic module, of the driver.

For example, after sorting, according to a time sequence, the multiple service requests that access the same driver, the interface module sends, to the driver logic that is of the driver and in the driver logic module, the multiple service requests one by one. Further, only after responding to a latest service request that is already sent to the driver logic, the interface module sends, to the driver logic, a next service request following the service request in the sorted multiple service requests.

In this embodiment of the present application, the interface module forwards a service request to the driver logic module according to an interface mapping table. Further, the interface module finds, in the interface mapping table according to an interface that receives the service request, an interface of a driver logic mapped to the interface that receives the service request, and forwards the service request to the interface of the driver logic. In this way, the driver logic module receives the service request using the interface of the driver logic in order to execute the driver logic on the service request.

Step 313: The driver logic module responds to the service request that is forwarded by the interface module in step S312.

The driver logic module responds to the service request after the interface module forwards the service request to the driver logic, in the driver logic module, of the driver, including executing the driver logic on the service request to provide a driver service.

For example, the driver logic module executes the driver logic, in the driver logic module, that is of the network driver and that is used to respond to the network I/O request. The driver logic is used to send the data carried in the network I/O request to the network.

For another example, the driver logic module executes the driver logic, in the driver logic module, that is of the file system driver and that is used to respond to the write request. The driver logic is used to write the data carried in the write request into the file system.

Optionally, actions (including performing step S311 and step S312) of the interface module and an action (including performing step S313) of the driver logic module are all implemented by executing computer instructions by a processor 101 of a computer device 100.

Method Flowchart of Updating a Loadable Kernel Module

Figure 4:
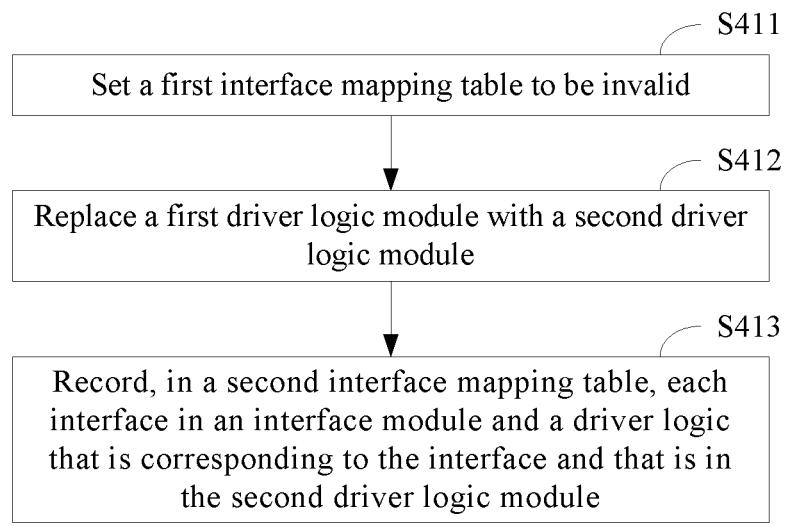
FIG. 4 is a schematic flowchart of a kernel update method according to an embodiment of the present application.

Referring to FIG. 4, an embodiment of the present application provides a kernel update method. A driver logic module is mainly updated when a loadable kernel module is updated using the kernel update method. To demonstrate a difference in the driver logic module before and after an update, in description of the kernel update method, an original driver logic module is referred to as a first driver logic module, and an updated driver logic module is referred to as a second driver logic module.

The kernel update method is implemented by the computer device 100 shown in FIG. 1. Further, a processor 101 of the computer device 100 executes computer instructions (which may be stored in a storage 105 and/or a memory 102) to implement steps of the kernel update method.

An optional step of the kernel update method is as follows. When the computer device 100 receives a kernel update instruction, the computer device 100 determines that the first driver logic module successfully executes an earlier service request and then performs step S411. For example, an interface module of the computer device 100 determines that the first driver logic module successfully executes the earlier service request and then performs step S411. The kernel update instruction instructs to update the loadable kernel module. The earlier service request is any service request on which the first driver logic module is executing a driver logic when the computer device 100 receives the kernel update instruction.

Further, when a service application uses a driver (invoked using a system) and sends the earlier service request to an interface of the driver, the service application records the interface of the driver in a context stack of the service application.

Subsequently, in a process in which the first driver logic module executes the driver logic on the earlier service request, if data needs to be fed back to the service application, the first driver logic module first sends the data to the interface module.

The interface module receives the data that is fed back by the first driver logic module to the service application, determines, according to a first interface mapping table, an interface that is corresponding to the driver logic and that is in the interface module, and then forwards, according to the context stack of the service application, the data to the service application that invokes the interface.

In this embodiment of the present application, when receiving data that is fed back by the first driver logic module in execution of a last earlier service request, the interface module determines that the first driver logic module successfully executes the earlier service request.

Step S411 is not performed until the first driver logic module successfully executes the earlier service request.

Therefore, it can be ensured that all the earlier service requests of the service application are responded to, and service correctness of the service application can be ensured, thereby improving security of the service application.

An optional step of the kernel update method is as follows. When the computer device 100 receives a kernel update instruction, the computer device 100 may directly perform step S411. For example, the computer device 100 may instruct the interface module to directly perform step S411. The computer device 100 does not need to wait until the first driver logic module successfully executes the earlier service request, but directly performs step S411. In this way, efficiency of updating the loadable kernel module can be improved.

In an application scenario, if there is no need to consider a state of providing a driver service for the service application before the loadable kernel module is updated, the computer device 100 may instruct the interface module to directly perform step S411 when the computer device 100 receives the kernel update instruction.

The following describes main procedure steps of the kernel update method (step S411, step S412, and step S413).

Step S411: Set a first interface mapping table to be invalid.

The first interface mapping table is an interface mapping table used to forward a service request to the first driver logic module. The first interface mapping table records each interface in the interface module and a driver logic that is corresponding to each interface in the interface module and that is in the first driver logic module. That is, the first interface mapping table records a correspondence between all interfaces in the interface module and all driver logics in the first driver logic module, and the correspondence is the same as a correspondence between an interface of an original driver (a driver provided by an original loadable kernel module) and a driver logic of the original driver.

The interface module and the first driver module are deployed on the computer device 100.

The computer device 100 performs step S411 to set the first interface mapping table to be invalid. Optionally, the computer device 100 instructs the interface module to set the first interface mapping table to be invalid. Alternatively, the computer device 100 instructs, using the first driver logic module, the interface module to set the first interface mapping table to be invalid such that the interface module sets, according to the instruction of the computer device 100, the first interface mapping table to be invalid.

An implementation of setting, by the computer device 100, the first interface mapping table to be invalid is not limited in this embodiment of the present application. An implementation provided in the other approaches may be used, or the following three implementations may be used.

In a first implementation, the computer device 100 (which may be the interface module) sets an invalidity identifier for the first interface mapping table. The invalidity identifier indicates to the interface module that the first interface mapping table is invalid. The interface module does not use the invalid first interface mapping table to forward a service request.

In a second implementation, the computer device 100 (which may be the interface module) sets an invalidity identifier for a driver logic (which may be an interface of the driver logic) in the first interface mapping table. The invalidity identifier indicates to the interface module that a driver logic (which may be an interface of the driver logic) found according to the first interface mapping table is invalid. The interface module does not forward a service request to the invalid driver logic (which may be the interface of the driver logic) according to the first interface mapping table.

In a third implementation, the computer device 100 (which may be the interface module) deletes all driver logics (which may be interfaces of the driver logics) included in the first driver logic module that are recorded in the first interface module. In this way, the interface module cannot find a driver logic according to the first interface mapping table, which may mean that the interfaces of all the driver logics included in the first driver logic module cannot be found. Therefore, the first interface mapping table that includes no driver logic (which may be an interface of a driver logic) is invalid.

After the computer device 100 sets the first interface mapping table to be invalid, the interface module stops forwarding a new service request to the first driver logic module according to the first interface mapping table. The new service request is any service request that is received from the service application by the interface module after the first interface mapping table is set to be invalid. In this way, the first driver logic module does not receive the new service request, and does not need to respond to the new service request, but temporarily stops providing a driver service for the service application.

Optionally, if the computer device 100 allocates storage space in a memory to the interface module, the interface module may continue to receive the new service request of the service application after the first interface mapping table is set to be invalid, and use the storage space to buffer the new service request. Further, after the first interface mapping table is set to be invalid, the interface module may continue to receive the new service request of the service application based on a communications connection between the loadable kernel module and the service application. The interface module buffers the new service request, but does not forward the new service request to the first driver logic module, and temporarily stops providing a driver service for the service application. Subsequently, the interface module responds to the new service request in order to resume providing the driver service for the service application.

Further, optionally, the storage space is limited. Therefore, when the interface module buffers the new service request, the computer device 100 instructs the service application to stop sending the new service request to the interface module.

Optionally, if the computer device 100 does not allocate storage space in the memory to the interface module, the interface module only can directly forward a service request received from the service application to a driver logic module. In this case, before setting the first interface mapping table to be invalid in step S411, the computer device 100 instructs the service application to stop sending any new service request to the interface module. In this way, loss of the new service request that is received by the interface module when step S411 is performed can be avoided.

In this embodiment of the present application, an implementation of instructing, by the computer device 100, the service application to stop sending the new service request to the interface module is as follows. If the service application sends a new service request directly to the interface module, the computer device 100 (which may be the interface module deployed in the computer device 100) instructs the service application to stop sending the new service request to the interface module.

Further, optionally, if a new service request sent by the service application to the interface module needs to be forwarded by another module, the computer device 100 (which may be the interface module deployed in the computer device 100) instructs the other module to temporarily stop forwarding the new service request of the service application to the interface module.

Step S412: Replace the first driver logic module with the second driver logic module.

The second driver logic module includes a driver logic capable of providing a driver service for the service application. The driver logic is a driver logic of an updated driver (a driver provided by an updated loadable kernel module).

It should be learned that the second driver logic module includes the driver logic of the updated driver (the driver provided by the updated loadable kernel module), and the first driver logic module includes a driver logic of an original driver (a driver provided by an original loadable kernel module). Generally, the driver logic of the updated driver and the driver logic of the original driver may be partially or totally different, for example, may provide different functions.

An implementation of replacing, by the computer device 100, the first driver logic module with the second driver logic module is not limited in this embodiment of the present application. An implementation provided in the other approaches may be used, or the following two implementations may be used.

In a first implementation, the computer device 100 does not unload the first driver logic module from the loadable kernel module, but directly replaces the first driver logic module with the second driver logic module, for example, loads the second driver logic module using a memory resource occupied by the first driver logic module. In this way, replacement efficiency can be ensured, a time for using the second driver logic module to respond to the new service request is shortened, thereby reducing a time for resuming a driver service.

In a second implementation, the computer device 100 unloads the first driver logic module from the loadable kernel module and then loads the second driver logic module into the loadable kernel module. Unloading of the first driver logic module may release a resource (for example, a memory resource) occupied by the first driver logic module. Then, a resource is reallocated for loading the second driver logic module. In this way, a resource can be effectively used. Compared with the first implementation, the second implementation can ensure subsequent stable running of the second driver logic module. For example, the second driver logic module does not run abnormally because of access to residual data or a residual instruction, in the memory, of the first driver logic module.

In this embodiment of the present application, an interface of the updated driver (the driver provided by the updated loadable kernel module) and an interface of the original driver (the driver provided by the original loadable kernel module) are a same interface, where the updated driver and the original driver provide a driver service for a same service application. Therefore, an interface recorded in the interface module remains unchanged before and after step S412 (replacing the first driver logic module with the second driver logic module). In addition, a driver logic, in the first driver logic module, that is corresponding to an interface in the interface module and a driver logic, in the second driver logic module, that is corresponding to the interface provide a driver service for a same service application.

Step S413: Record, in a second interface mapping table, each interface in the interface module and a driver logic that is corresponding to the interface and that is in the second driver logic module.

The second interface mapping table is an interface mapping table used to forward a service request to the second driver logic module. The second interface mapping table records each interface in the interface module and a driver logic that is corresponding to each interface in the interface module and that is in the second driver logic module. That is, the second interface mapping table records a correspondence between all interfaces in the interface module and all driver logics in the second driver logic module, and the correspondence is the same as a correspondence between the interface of the updated driver (the driver provided by the updated loadable kernel module) and the driver logic of the updated driver.

The second interface mapping table may be a new table different from the first interface mapping table. Therefore, the first interface mapping table and the second interface mapping table may coexist. If the second driver logic module is replaced with the first driver logic module subsequently, the computer device 100 may set the valid second interface mapping table to be invalid and set the invalid first interface mapping table to be valid such that the interface module can send a service request to the first driver logic module according to the valid first interface mapping table. In this way, a driver service may be efficiently resumed using an interface mapping table corresponding to a replaced driver logic module during replacement of a driver logic module.

The second interface mapping table may be the first interface mapping table that is set to be invalid. The first interface mapping table and the second interface mapping table record same interfaces (that is, all the interfaces included in the interface module). Therefore, when updating the correspondence (which is updated to the correspondence between all the interfaces included in the interface module and all the driver logics included in the second driver logic module) recorded in the second interface mapping table, the computer device 100 needs to update only all the driver logics included in the second driver logic module. In this way, data that needs to be recorded is reduced, and recording efficiency is improved.

In an implementation example, the computer device 100 uses, as the second interface mapping table, the first interface mapping table from which all the driver logics (which may be the interfaces of the driver logics) included in the first driver logic module are deleted, and then establishes, in the second interface mapping table, the correspondence between all the interfaces included in the interface module and all the driver logics (which may be the interfaces of the driver logics) included in the second driver logic module.

Optionally, after the correspondence between all the interfaces included in the interface module and all the driver logics included in the second driver logic module is recorded in the second interface mapping table, the second interface mapping table is set to be valid such that the interface module sends a new service request to the second driver logic module according to the valid second interface mapping table.

In this embodiment of the present application, if the computer device 100 instructs the service application to stop sending a new service request to the interface module before the first driver logic is replaced with the second driver logic, the computer device 100 instructs the service application to resume sending a new service request to the interface module after the first driver logic module is replaced with the second driver logic module in step S412 or after the correspondence between all the interfaces included in the interface module and all the driver logics included in the second driver logic module is recorded in the second interface mapping table.

If the interface module buffers a new service request, the interface module first forwards the buffered new service request to the second driver logic module, and then forwards a new service request that is received from the service application after the service application resumes sending a new service request to the interface module.

An implementation of sending, by the interface module, a new service request to the second driver logic module according to the second interface mapping table is as follows. The interface searches, according to an interface that receives the new service request, the second interface mapping table for an interface of a driver logic corresponding to the interface, and sends the new service request to the interface of the driver logic. Then, the second driver logic module executes the driver logic on the new service request, and resumes providing a driver service for the service application.

Optionally, the computer device 100 records, in a data module, a state of providing the driver service for the service application by the first driver logic module before the first driver logic module is replaced, that is, a state of the first driver logic module after the first driver logic module responds to a last service request before the first driver logic module is replaced. After the first driver logic module is replaced with the second driver logic module, the second driver logic module executes the driver logic on the new service request based on the state.

It should be learned that in the following two cases, the second driver logic module can respond to the new service request based on the state only after the computer device 100 updates the state.

In a first case, if there is new data that is used for the second driver logic module and is related to the state, and the new data is not used for the first driver logic module, the computer device 100 adds the new data to the state stored in the data module.

In a second case, if the state recorded in the data module is data in a first version, the computer device 100 updates the data in the first version in the data module to data in a second version supported by the second driver logic module. The first version and the second version are different versions. For example, the first version and the second version indicate different formats, or the first version and the second version have different data arrangement manners.

For example, the state recorded in the data module is data in a first format. Before the second driver logic module executes the second driver logic on the new service request based on the state recorded in the data module, the computer device 100 updates the data in the first format to data in a second format supported by the second driver logic module. The first format and the second format mean different formats. For example, the first format and the second format use different binary code to represent same data.

It can be learned that in the other approaches, an entire loadable kernel module needs to be unloaded, and this terminates a driver service provided for a service application and releases a resource occupied by a communications connection between the loadable kernel module and the service application. After a new loadable kernel module is loaded, the service application establishes a communications connection with a new loadable kernel module, and provides the driver service for the service application again based on the communications connection. In the kernel update method according to this embodiment of the present application, during replacement of a driver logic module, a communications connection between the service application and the interface module is not interrupted. After replacement of the driver logic module is completed, the service application may continue to send a service request to the interface module based on the communications connection, and the driver logic module responds to the service request in order to resume providing a driver service for the service application. It can be learned that in this embodiment of the present application, only the driver service provided for the service application is temporarily stopped when the loadable kernel module is updated. In the kernel update method, a short time is required for updating the loadable kernel module. Therefore, time costs for resuming the driver service are reduced and efficiency of resuming the driver service is improved. To sum up, according to the kernel update method, the loadable kernel module can be updated without sensing by a user.

Figure 5C:
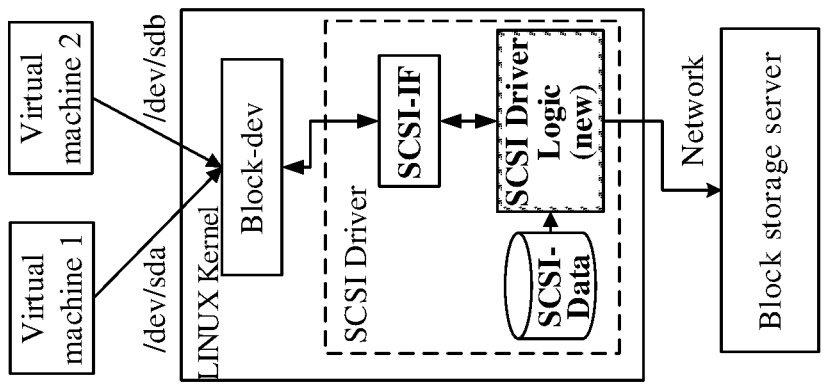
FIG. 5A, FIG. 5B and FIG. 5C are a schematic diagram of a state change in updating a "small computer system interface driver (SCSI) Driver"
Figure 5B:
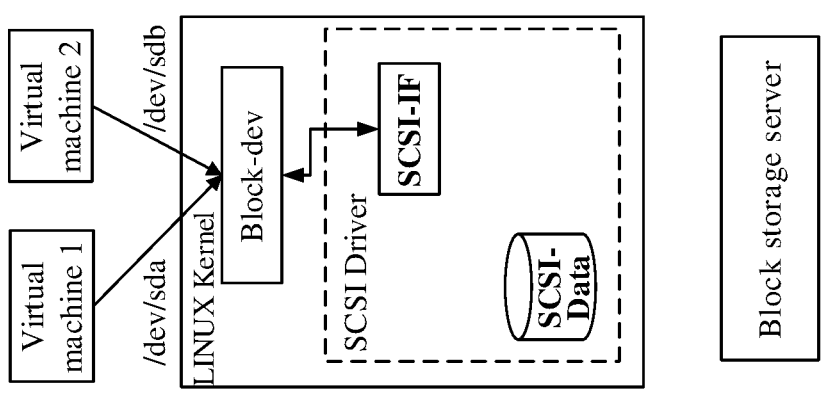
Figure 5A:
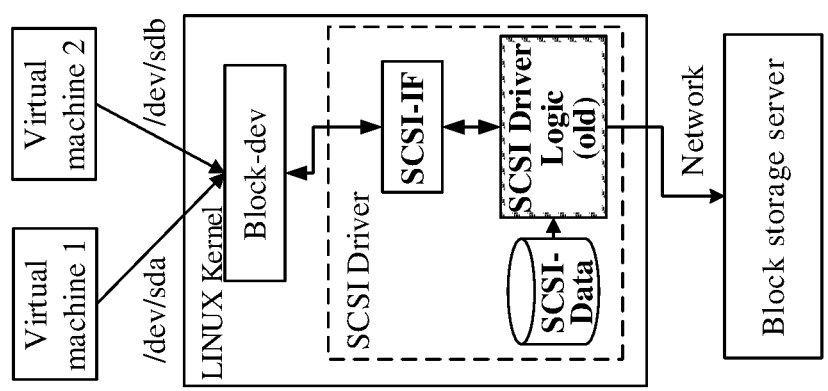

Implementation Example of Updating a Loadable Kernel Module Using a Kernel Update Method FIGS. 5A-5C provide an application scenario of a block storage service. In the application scenario shown in FIGS. 5A-5C, a LINUX kernel is denoted by a " LINUX Kernel". In this example, a loadable kernel module of the " LINUX Kernel" includes only one driver. The driver is a block storage driver, and the block storage driver is denoted by a "SCSI Driver".

In FIGS. 5A-5C, an interface module, a driver logic module, and a data module of the loadable kernel module are respectively denoted by a "SCSI-IF" module, a "SCSI Driver Logic" module, and a "SCSI-Data" module. The "SCSI-IF" module is deployed with an interface of the "SCSI Driver", the "SCSI Driver Logic" module is deployed with a driver logic of the "SCSI Driver", and the "SCSI-Data" module is configured to store states of the "SCSI Driver Logic" module in providing a driver service separately for a "virtual machine 1" (deployed with a service application) and a "virtual machine 2" (deployed with a service application). In FIGS. 5A and in 5C, an original "SCSI Driver Logic" module is denoted by a "SCSI Driver Logic (old)" module, and an updated "SCSI Driver Logic" module is denoted by a "SCSI Driver Logic (new)" module.

In this application scenario, a block storage server creates a virtual disk, and notifies the "SCSI Driver" of a capacity of the virtual disk, a number of the virtual disk, and a quantity of virtual disks. The "SCSI Driver" records state data (the capacity of the virtual disk, the number of the virtual disk, and the quantity of virtual disks) into the "SCSI-Data" module.

In this application scenario, the "SCSI Driver" creates, based on the virtual disk, two virtual block devices using a block device management function (also referred to as a Block-dev function in the LINUX kernel) that is provided by a base kernel of the "LINUX Kernel". The two virtual block devices are respectively denoted by "/dev/sda" and "/dev/sdb" in FIGS. 5A-5C.

In this application scenario, a service application is deployed on the two virtual machines. The two virtual machines are respectively denoted by the "virtual machine 1" and the "virtual machine 2" in FIGS. 5A-5C, and "/dev/sda" and "/dev/sdb" are respectively used by the "virtual machine 1" and the "virtual machine 2". It should be learned that the two virtual machines may be replaced with a process or a thread. That is, a service application may be deployed in the process or the thread, and "/dev/sda" and "/dev/sdb" are used by the process of the service application or the thread of the service application.

In this application scenario, access to "/dev/sda" or "/dev/sdb" is actually access to the virtual disk. Further, when the "virtual machine 1" and the "virtual machine 2" need to access data, the "virtual machine 1" and the "virtual machine 2" respectively send an access request to "/dev/sda" and "/dev/sdb". The access request may be a read request or a write request. The read request instructs to read data, and the write request instructs to write data. A device management module (which is denoted by a "Block-dev" module in FIGS. 5A-5C) that provides a device management function receives the access requests sent to "/dev/sda" and the access requests sent to "/dev/sdb". The "Block-dev" module converts the received access request into an SCSI command word. The SCSI command word obtained by means of conversion according to the access request records information such as the number of the virtual disk, a command word operation mode, and a data location. The "Block-dev" module sends the SCSI command word obtained by means of conversion to the "SCSI-IF" module of the "SCSI Driver".

The "SCSI-IF" module forwards, according to a third interface mapping table, the SCSI command word received from the "Block-dev" module to the "SCSI Driver Logic" module of the "SCSI Driver". The third interface mapping table is an interface mapping table applicable to this application scenario, and records a correspondence between an interface that is of the "SCSI Driver" and that is in the "SCSI-IF" module and a driver logic that is of the "SCSI Driver" and that is in the "SCSI Driver Logic" module. The "SCSI Driver Logic" module converts the SCSI command word into a network request, and sends the network request to the block storage server using a network (as shown in FIGS. 5A-5C) according to an IP address of the block storage server.

For example, for the third interface mapping table of the "SCSI-IF" module, refer to Table 3. In Table 3, three interfaces ("scsi-dispatch-func", "scsi_disk_add", and "scsi_disk_rmv") are sequentially corresponding to interfaces ("scsi_main_dispatch_func", "scsi_main_disk_add", and "scsi_main_disk_rmv") of three driver logics. In the three interfaces, "csi_main_dispatch_func" is an interface of a driver logic for converting a SCSI command word into a network request, "scsi_main_disk_add" is an interface of a driver logic for adding a virtual disk, and "scsi_main_disk_rmv" is an interface of a driver logic for unloading a virtual disk.

TABLE 3

| Interface | Interface of a driver logic |
| --- | --- |
| scsi-dispatch-func | scsi_main_dispatch_func |
| scsi_disk_add | scsi_main_disk_add |
| scsi_disk_rmv | scsi_main_disk_rmv |

The "SCSI-IF" module sends the SCSI command word to the "scsi_main_dispatch_func" interface according to the third interface mapping table. A driver logic executed by the "SCSI Driver Logic" module on the SCSI command word is converting the SCSI command word into the network request. The network request includes information such as the number of the virtual disk and a data location. After receiving the network request, the block storage server determines the virtual disk according to the number of the virtual disk, and accesses data in the virtual disk according to the data location, for example, reads data from the data location or writes data into the data location.

Figure 6:
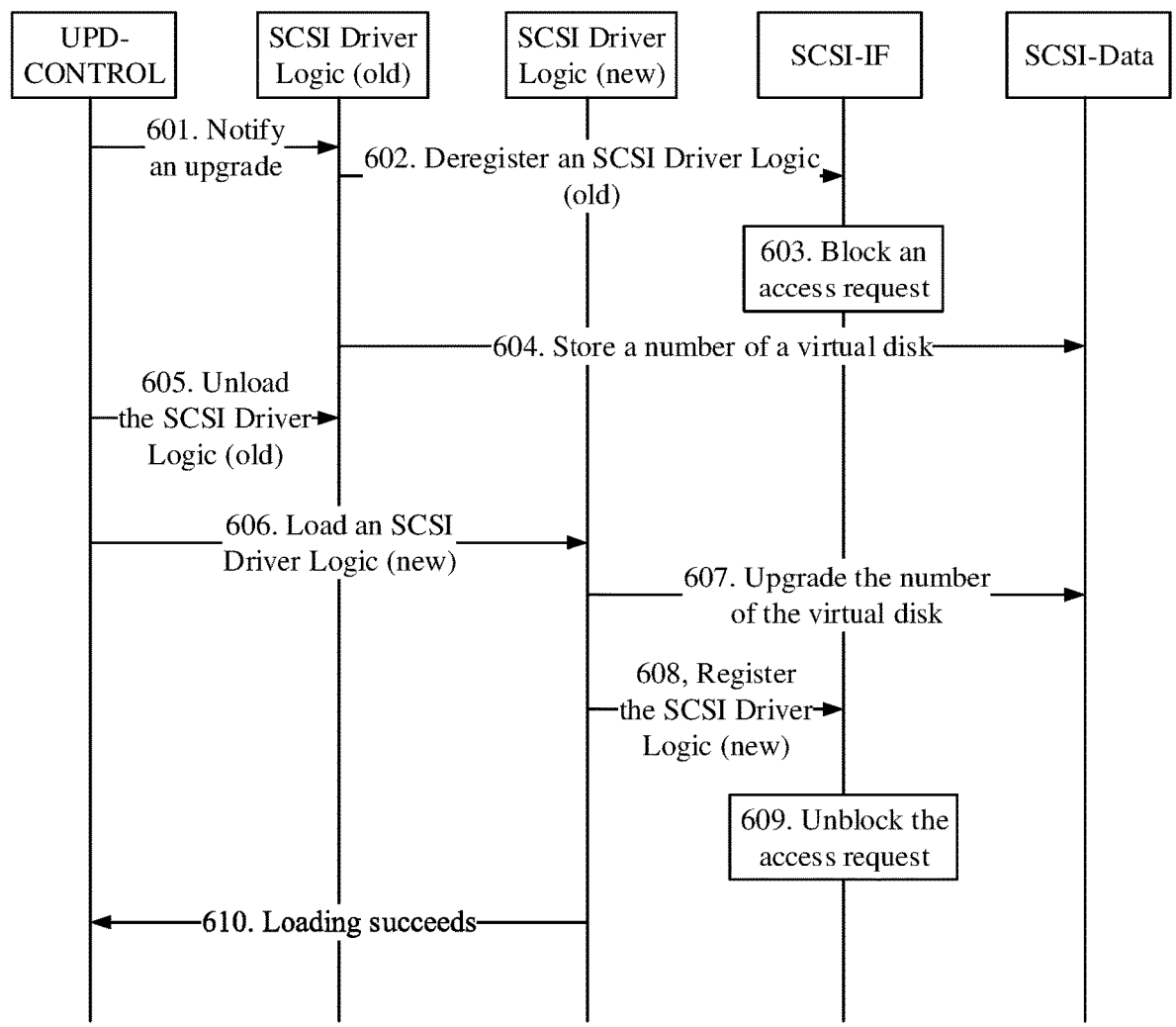
FIG. 6 is a schematic flowchart of updating a "SCSI Driver"

FIG. 6 shows a specific procedure in which the kernel update method shown in FIG. 3 is applied to the application scenario shown in FIGS. 5A-5C.

Step 601: An "UPD-CONTROL" module sends upgrade notification to a "SCSI Driver Logic (old)" module.

The "UPD-CONTROL" module is deployed on a computer device 100 shown in FIG. 1 and configured to control an upgrade procedure of a loadable kernel module. The "UPD-CONTROL" module is not illustrated in FIGS. 5A-5C.

In this embodiment, the "UPD-CONTROL" module sends the upgrade notification to the "SCSI Driver Logic (old)" module after receiving a kernel update instruction.

Step 602: The "SCSI Driver Logic (old)" module instructs a "SCSI-IF" module to deregister the "SCSI Driver Logic (old)" module.

Further, the "SCSI Driver Logic (old)" module instructs the "SCSI-IF" module to set a third interface mapping table to be invalid. For a specific implementation of setting, by the "SCSI-IF" module, the third interface mapping table to be invalid, refer to the detailed description of setting, by the computer device 100, the first interface mapping table to be invalid. For example, the "SCSI-IF" module may set an invalidity identifier for the third interface mapping table (for example, Table 3), or set an invalidity identifier for an interface that is of a driver logic included in the "SCSI Driver Logic (old)" module and that is recorded in the third interface mapping table (for example, Table 3), or delete interfaces that are of all driver logics included in the "SCSI Driver Logic (old)" module and that are recorded in the third interface mapping table (for example, Table 3).

The "SCSI Driver Logic (old)" module sets the third interface mapping table to be invalid such that the "SCSI Driver Logic (old)" module deregisters the "SCSI Driver Logic (old)" module.

Step 603: The "SCSI-IF" module blocks an access request.

Further, a "virtual machine 1" and a "virtual machine 2" send an access request to a "Block-dev" module by respectively using "/dev/sda" and "/dev/sdb". The "SCSI-IF" module invokes a blocking function provided by the "Block-dev" module. The blocking function temporarily provides the "Block-dev" module from sending, to the "SCSI-IF" module, a SCSI command word converted from the access request. Optionally, if storage space in a memory is allocated to the "Block-dev" module, the "Block-dev" module can continue receiving the access request of the "virtual machine 1" and the access request of the "virtual machine 2", and buffer the access requests in the storage space or convert the received access requests into SCSI command words and buffer the SCSI command words obtained by means of conversion.

Optionally, the computer device 100 may further set the "virtual machine 1" and the "virtual machine 2" to a blocked state using an OS. In this way, both the "virtual machine 1" and the "virtual machine 2" that are set to the blocked state stop sending an access request to the "Block-dev" module using "/dev/sda" and "/dev/sdb". Therefore, sending of an access request is stopped at a source (the "virtual machine 1" and the "virtual machine 2"). If the storage space used for buffering the access request or SCSI command words is allocated to the "Block-dev" module, the storage space in the "Block-dev" module is saved, and loss of an access request or a SCSI command word caused by insufficient storage space is avoided.

Optionally, if no storage space in the memory is allocated to the "Block-dev" module, the "Block-dev" module converts an access request each time received from the "virtual machine 1" and the "virtual machine 2" into a SCSI command word, and sends the SCSI command word directly to the "SCSI-IF" module. Therefore, when no storage space is allocated to the "Block-dev" module, the computer device 100 needs to set the "virtual machine 1" and the "virtual machine 2" to the blocked state using the OS.

Optionally, the "SCSI-IF" module notifies, only after an access request is blocked in step 603, the "SCSI Driver Logic (old)" module that deregistration of the "SCSI Driver Logic (old)" module is completed such that the "SCSI Driver Logic (old)" module performs step 604 after receiving notification indicating that the deregistration is completed.

Step 604: The "SCSI Driver Logic (old)" module stores, into a "SCSI-Data" module, a number of a virtual disk.

In this application scenario, the number of the virtual disk is a state of providing a driver service for the "virtual machine 1" and the "virtual machine 2" by the "SCSI Driver Logic (old)" module before the "SCSI Driver Logic (old)" module is updated. The "SCSI-Data" module may be partial storage space in the memory.

The "SCSI Driver Logic (old)" module stores a version number of the number of the virtual disk when storing the number of the virtual disk into the "SCSI-Data" module.

Step 605: The "UPD-CONTROL" module unloads the "SCSI Driver Logic (old)" module.

For a specific manner of unloading the "SCSI Driver Logic (old)" module by the "UPD-CONTROL" module, refer to the foregoing related description of unloading the first driver logic module.

FIG. 5A illustrates a "SCSI Driver" that is before the "SCSI Driver Logic (old)" module is unloaded, and FIG. 5B illustrates a "SCSI Driver" that is after the "SCSI Driver Logic (old)" module is unloaded.

Step 606: The "UPD-CONTROL" module loads a "SCSI Driver Logic (new)" module.

For a specific manner of loading a "SCSI Driver Logic (new)" module by the "UPD-CONTROL" module, refer to the foregoing related description of loading the second driver logic module.

FIG. 5C illustrates a "SCSI Driver" that is after the "SCSI Driver Logic (new)" module is loaded.

After the "SCSI Driver Logic (new)" module is loaded, the "SCSI Driver Logic (new)" module checks whether a version of a state supported by the "SCSI Driver Logic (new)" module is different from the version of the number of the virtual disk recorded in the "SCSI-Data" module. For example, different versions may mean different formats of the state. If the versions are different, the "SCSI Driver Logic (new)" module performs step 607, if the versions are the same, the "SCSI Driver Logic (new)" module directly performs step 608, that is, skips performing step 607.

Step 607: The "SCSI Driver Logic (new)" module upgrades the number of the virtual disk recorded in the "SCSI-Data" module.

Further, the number of the virtual disk recorded in the "SCSI-Data" module is updated to a number of a virtual disk in a version supported by the "SCSI Driver Logic (new)" module.

Step 608: The "SCSI Driver Logic (new)" module instructs the "SCSI-IF" module to register the "SCSI Driver Logic (new)" module.

Further, the "SCSI Driver Logic (new)" module sends, to the "SCSI-IF" module, an interface of a driver logic included in the "SCSI Driver Logic (new)" module. The "SCSI-IF" module updates, in the third interface mapping table using an interface of a driver logic in the "SCSI Driver Logic (new)" module, an interface of a driver logic in the "SCSI Driver Logic (old)" module in a one-to-one manner.

Optionally, the "SCSI Driver Logic (new)" module sends, in a fixed format to the "SCSI-IF" module, an interface of a driver logic included in the "SCSI Driver Logic (new)" module. The "SCSI-IF" module updates, in the third interface mapping table according to the fixed format and using the interface of the driver logic included in the "SCSI Driver Logic (new)" module in a one-to-one manner, an interface of a driver logic included in the "SCSI Driver Logic (old)" module.

Step 609: The "SCSI-IF" module unblocks the access request.

Further, a reverse action of an action in step 603 is performed in step 609. For example, the "SCSI-IF" module invokes a resumption function provided by the "Block-dev" module. The resumption function undoes the blocking function invoked by the "SCSI-IF" module in step 603 such that the "Block-dev" module continues to send, to the "SCSI-IF" module, the SCSI command word converted from the access request.

Optionally, if the computer device 100 sets the "virtual machine 1" and the "virtual machine 2" to the blocked state before the "SCSI Driver Logic (old)" module is unloaded, after the "SCSI Driver Logic (new)" module is loaded, the blocked state of the "virtual machine 1" and the "virtual machine 2" is canceled using the OS such that the "virtual machine 1" and the "virtual machine 2" can send an access request to the "Block-dev" module using "/dev/sda" and "/dev/sdb".

After performing step 609, the "SCSI-IF" module may notify the "SCSI Driver Logic (new)" module that the access request is already unblocked such that the "SCSI Driver Logic (new)" module performs step 610.

Step 610: The "SCSI Driver Logic (new)" module notifies the "UPD-CONTROL" module of successful loading.

After the "SCSI Driver Logic (new)" module is loaded, the "Block-dev" module converts the access request blocked in step 603 into a SCSI command word, and sends the SCSI command word to the "SCSI-IF" module. The "SCSI-IF" module forwards the SCSI command word to an interface of the "SCSI Driver Logic (new)" module according to an updated third interface mapping table. The "SCSI Driver Logic (new)" module converts the received SCSI command word into a network request using a driver logic that is of the "SCSI Driver Logic (new)" module and that is corresponding to the SCSI command word. The network request includes the number of the virtual disk obtained after the version update. The "SCSI Driver Logic (new)" module sends the network request to a block storage server.

Apparatus Embodiment

This apparatus embodiment provides a kernel update apparatus, and the kernel update apparatus is deployed on a computer device 100. The kernel update apparatus includes function modules configured to execute the kernel update method provided in the foregoing method embodiment. Division of the function modules is not limited in this apparatus embodiment. The function modules may be divided according to procedure steps of the kernel update method, or may be divided according to a specific implementation requirement.

Figure 7:
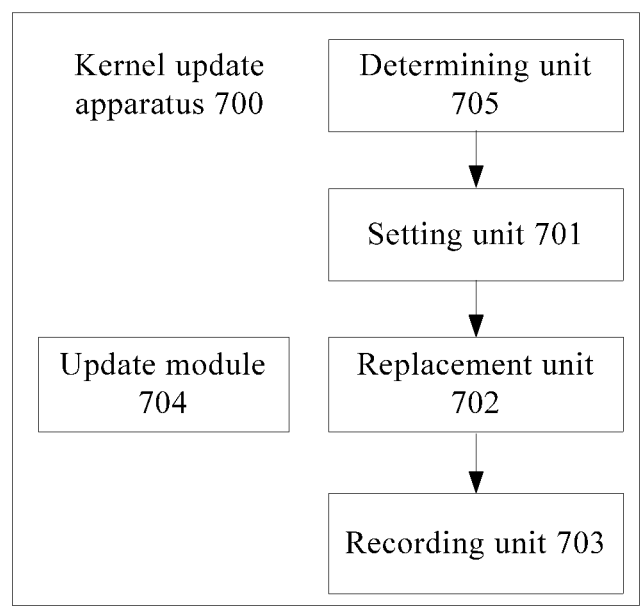
FIG. 7 is a schematic diagram of a logical structure of a kernel update apparatus according to an embodiment of the present application.

FIG. 7 provides an example of function division for a kernel update apparatus 700.

In this example, a loadable kernel module includes an interface module and a first driver logic module. The interface module includes at least one interface of each of at least one driver, and the first driver logic module includes at least one driver logic of each of the at least one driver. For detailed descriptions of the loadable kernel module, the driver, the interface module, and the first driver logic module, the interface, and the driver logic, refer to related descriptions in the method embodiment.

A first interface mapping table is used to record each interface in the interface module and a driver logic that is corresponding to the interface and that is in the first driver logic module. For a detailed description of the first interface mapping table, refer to a related description in the method embodiment.

Before the loadable kernel module is updated, the interface module forwards, according to the first interface mapping table, a received service request of a service application to a first driver logic corresponding to an interface that receives the service request. The first driver logic module executes the first driver logic on the service request. The first driver logic is a driver logic that provides a driver service for the service application and that is in the first driver logic module.

When the loadable kernel module is updated, referring to FIG. 7, the kernel update apparatus 700 includes a setting unit 701 configured to set the first interface mapping table to be invalid, where the invalid first interface mapping table makes the interface module stop sending, to the first driver logic according to the first interface mapping table, a new service request that is of the service application and that is received after the first interface mapping table is set to be invalid, a replacement unit 702 configured to replace the first driver logic module in the loadable kernel module with a second driver logic module, where the second driver logic module is an updated driver logic module, and the second driver logic module includes a second driver logic capable of providing a driver service for the service application, and the second driver logic is driver logic that provides a driver service for the service application and that is in the second driver logic module, and a recording unit 703 configured to record, in a second interface mapping table, each interface in the interface module and a driver logic that is corresponding to the interface and that is in the second driver logic module such that the interface module sends, according to the second interface mapping table, the new service request to the second driver logic in the second driver logic module.

Optionally, the loadable kernel module further includes a data module. The data module is configured to record a state of providing a driver service for the service application by the first driver logic before the first driver logic is replaced. For detailed descriptions of the data module and the state, refer to related descriptions in the method embodiment.

The second driver logic module executes, based on the state recorded in the data module, the second driver logic on the new service request.

Optionally, the state recorded in the data module is data in a first format.

Referring to FIG. 7, the kernel update apparatus 700 further includes an update module 704 configured to, before the second driver logic module executes, based on the state recorded in the data module, the second driver logic on the new service request, update the data in the first format to data in a second format supported by the second driver logic module.

Optionally, referring to FIG. 7, the kernel update apparatus 700 further includes a determining unit 705 configured to receive a kernel update instruction before the setting unit 701 sets the first interface mapping table to be invalid, where the kernel update instruction instructs to update the loadable kernel module, and determine that the first driver logic module successfully executes an earlier service request, where the earlier service request is any service request on which the first driver logic module executes the first driver logic when the kernel update instruction is received.

Optionally, the setting unit 701 is configured to delete all driver logics included in the first driver logic module that are recorded in the first interface mapping table.

Optionally, the replacement unit 702 is configured to unload the first driver logic module from the loadable kernel module, and load the second driver logic module into the loadable kernel module.

Optionally, both the setting unit 701 and the recording unit 703 may be integrated into the interface module, and both a function of the setting unit 701 and a function of the recording unit 703 may be implemented by the interface module.

The foregoing embodiments are merely intended to describe the technical solutions of the present application, but not to limit the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present application.

What is claimed is:

1. A kernel update method applied to a loadable kernel module that is a part of a kernel, wherein the method comprises:

setting a first interface mapping table to be invalid to enable an interface block to stop sending, to a first driver logic according to the first interface mapping table, a new service request of a service application received after the first interface mapping table is set to be invalid, wherein the loadable kernel module comprises the interface block and a first driver logic block, wherein the interface block comprises at least one interface of each of at least one driver, wherein the first driver logic block comprises at least one driver logic of each of the at least one driver, wherein the interface block is configured to forward, according to the first interface mapping table, a received service request of the service application to a first driver logic corresponding to an interface receiving the received service request, wherein the first driver logic block is configured to execute the first driver logic on the received service request, and wherein the first interface mapping table records each interface in the interface block and a driver logic corresponding to each interface;

replacing the first driver logic block in the loadable kernel module with a second driver logic block, wherein the second driver logic block is an updated driver logic block and comprises a second driver logic capable of providing a driver service for the service application;

creating a second interface mapping table in the loadable kernel module, wherein the first interface mapping table and the second interface mapping table coexist in the interface block of the loadable kernel module; and recording, in the second interface mapping table, each interface in the interface block and a driver logic corresponding to each interface in the second driver logic block to enable the interface block to send, according to the second interface mapping table, the new service request to the second driver logic in the second driver logic block, wherein setting the first interface mapping table to be invalid comprises deleting all driver logics comprised in the first driver logic block recorded in the first interface mapping table, wherein the loadable kernel module comprises drivers of an operating system, wherein the drivers are loaded simultaneously, wherein only the first driver logic block is replaced in the kernel update method and the interface block is not unloaded throughout the kernel update method.

2. The kernel update method of claim 1, wherein the loadable kernel module further comprises a data block coupled to the interface block and configured to record a state of providing the driver service for the service application by the first driver logic before the first driver logic is replaced, and wherein after replacing the first driver logic block in the loadable kernel module with the second driver logic block, the kernel update method further comprises executing, by the second driver logic block based on the state recorded in the data block, the second driver logic on the new service request.

3. The kernel update method of claim 2, wherein the state recorded in the data block comprises data in a first format, and wherein before executing the second driver logic on the new service request, the kernel update method further comprises updating the data in the first format to data in a second format supported by the second driver logic block.

4. The kernel update method of claim 1, wherein before setting the first interface mapping table to be invalid, the kernel update method further comprises:

receiving a kernel update instruction instructing to update the loadable kernel module; and determining that the first driver logic block successfully executes an earlier service request, wherein the earlier service request comprises any service request on which the first driver logic block executes the first driver logic when the kernel update instruction is received.

5. The kernel update method of claim 1, wherein replacing the first driver logic block with the second driver logic block comprises:
   unloading the first driver logic block from the loadable kernel module; and
   loading the second driver logic block into the loadable kernel module.

6. A computer program product comprising a non-transitory computer-readable medium storing instructions executed by a processor to update a loadable kernel module comprised in a kernel, and wherein the instructions cause the processor to:
   set a first interface mapping table to be invalid to enable an interface block to stop sending, to a first driver logic according to the first interface mapping table, a new service request of a service application received after the first interface mapping table is set to be invalid, wherein the loadable kernel module comprises the interface block and a first driver logic block, wherein the interface block comprises at least one interface of each of at least one driver, wherein the first driver logic block comprises at least one driver logic of each of the at least one driver, wherein the interface block is configured to forward, according to the first interface mapping table, a received service request of the service application to a first driver logic corresponding to an interface receiving the received service request, wherein the first driver logic block is configured to execute the first driver logic on the received service request, and wherein the first interface mapping table records each interface in the interface block and a driver logic corresponding to each interface;
   replace the first driver logic block in the loadable kernel module with a second driver logic block, wherein the second driver logic block is an updated driver logic block and comprises a second driver logic capable of providing a driver service for the service application;
   create a second interface mapping table in the loadable kernel module, wherein the first interface mapping table and the second interface mapping table coexist in the interface block of the loadable kernel module; and
   record, in the second interface mapping table, each interface in the interface block and a driver logic corresponding to each interface in the second driver logic block to enable the interface block to send, according to the second interface mapping table, the new service request to the second driver logic in the second driver logic block,
   wherein setting the first interface mapping table to be invalid comprises deleting all driver logics comprised in the first driver logic block recorded in the first interface mapping table,
   wherein the loadable kernel module comprises drivers of an operating system,
   wherein the drivers are loaded simultaneously,
   wherein only the first driver logic block is replaced in the kernel update method and the interface block is not unloaded throughout the kernel update method.

7. The computer program product of claim 6, wherein the loadable kernel module further comprises a data block coupled to the interface block and configured to record a state of providing the driver service for the service application by the first driver logic before the first driver logic is replaced, and wherein the instructions further cause the processor to be configured to execute, using the second driver logic block and based on the state recorded in the data block, the second driver logic on the new service request.

8. The computer program product of claim 7, wherein the state recorded in the data block comprises data in a first format, and wherein before executing the second driver logic on the new service request, the instructions further cause the processor to be configured to update the data in the first format to data in a second format supported by the second driver logic.

9. The computer program product of claim 6, wherein the instructions further cause the processor to be configured to:
   receive a kernel update instruction instructing to update the loadable kernel module before the first interface mapping table is set to be invalid; and
   determine that the first driver logic block successfully executes an earlier service request, wherein the earlier service request comprises any service request on which the processor executes, using the first driver logic block, the first driver logic when the kernel update instruction is received.

10. The computer program product of claim 6, wherein the instructions further cause the processor to be configured to:
    unload the first driver logic block from the loadable kernel module; and
    load the second driver logic block into the loadable kernel module.

11. A computer device, comprising:
    a non-transitory computer-readable storage medium storing instructions to update a loadable kernel module comprised in a kernel; and
    a processor coupled to the non-transitory computer-readable storage medium, wherein the instructions cause the processor to:
    set a first interface mapping table to be invalid to enable an interface block to stop sending, to a first driver logic according to the first interface mapping table, a new service request of a service application received after the first interface mapping table is set to be invalid, wherein the loadable kernel module comprises the interface block and a first driver logic block, wherein the interface block comprises at least one interface of each of at least one driver, wherein the first driver logic block comprises at least one driver logic of each of the at least one driver, wherein the interface block is configured to forward, according to the first interface mapping table, a received service request of the service application to a first driver logic corresponding to an interface receiving the received service request, wherein the first driver logic block is configured to execute the first driver logic on the received service request, and wherein the first interface mapping table records each interface in the interface block and a driver logic corresponding to each interface;
    replace the first driver logic block in the loadable kernel module with a second driver logic block, wherein the second driver logic block is an updated driver logic block and comprises a second driver logic capable of providing a driver service for the service application;
    create a second interface mapping table in the loadable kernel module, wherein the first interface mapping table and the second interface mapping table coexist in the interface block of the loadable kernel module; and record, in the second interface mapping table, each interface in the interface block and a driver logic corresponding to each interface in the second driver logic block to enable the interface block to send, according to the second interface mapping table, the new service request to the second driver logic in the second driver logic block, wherein setting the first interface mapping table to be invalid comprises deleting all driver logics comprised in the first driver logic block recorded in the first interface mapping table, wherein the loadable kernel module comprises drivers of an operating system, wherein the drivers are loaded simultaneously, wherein only the first driver logic block is replaced in the kernel update method and the interface block is not unloaded throughout the kernel update method.

12. The computer device of claim 11, wherein the loadable kernel module further comprises a data block coupled to the interface block and configured to record a state of providing the driver service for the service application by the first driver logic before the first driver logic is replaced, and wherein the instructions further cause the processor to be configured to execute, using the second driver logic block and based on the state recorded in the data block, the second driver logic on the new service request.

13. The computer device of claim 12, wherein the state recorded in the data block comprises data in a first format, and wherein before executing the second driver logic on the new service request, the instructions further cause the processor to be configured to update the data in the first format to data in a second format supported by the second driver logic.

14. The computer device of claim 11, wherein the instructions further cause the processor to be configured to:
receive a kernel update instruction instructing to update the loadable kernel module before the first interface mapping table is set to be invalid; and
determine that the first driver logic block successfully executes an earlier service request, wherein the earlier service request comprises any service request on which the first driver logic block executes the first driver logic when the kernel update instruction is received.

15. The computer device of claim 11, wherein the instructions further cause the processor to be configured to:
unload the first driver logic block from the loadable kernel module; and
load the second driver logic block into the loadable kernel module.

* * * * *